W. B. CARR.
Apparatus for and Method of Seaming Rubber Goods.
No. 222,345. Patented Dec. 9, 1879.
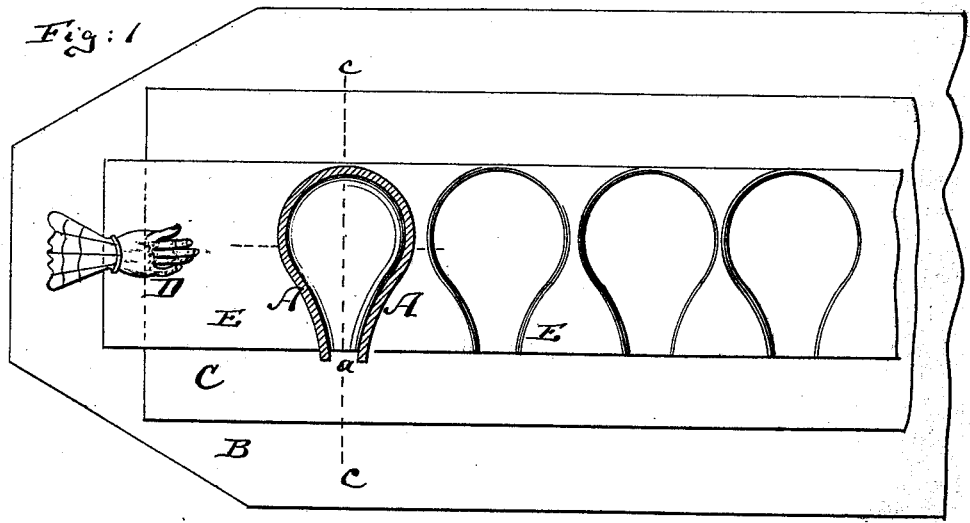
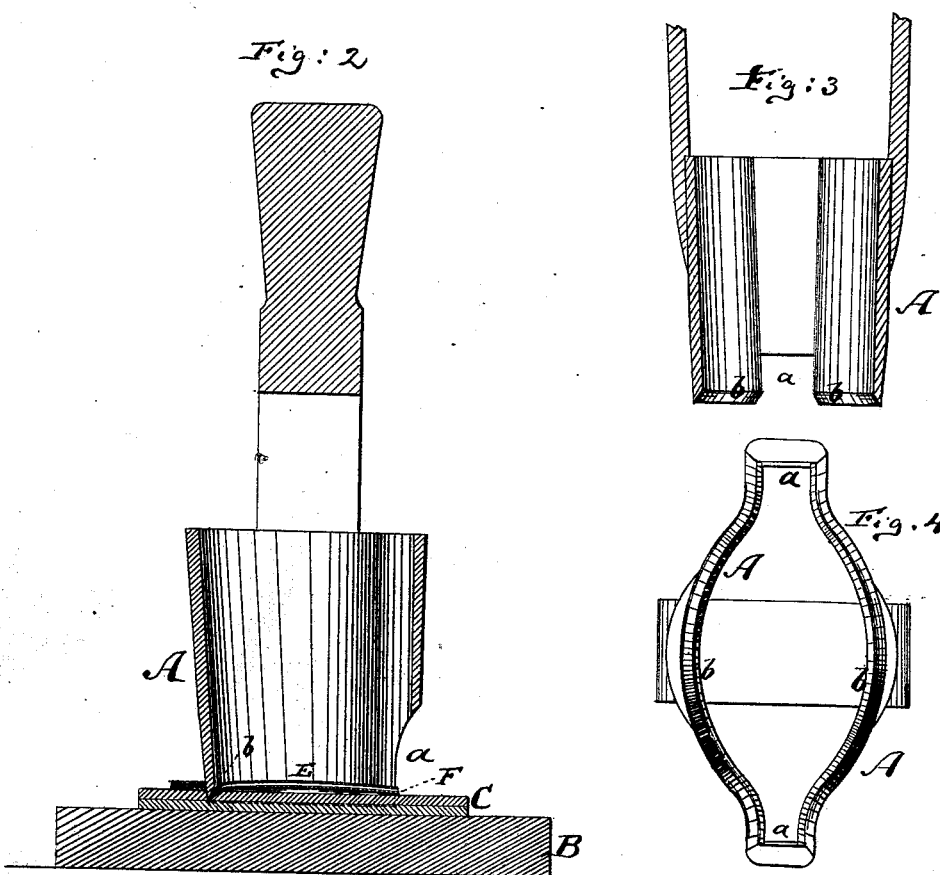
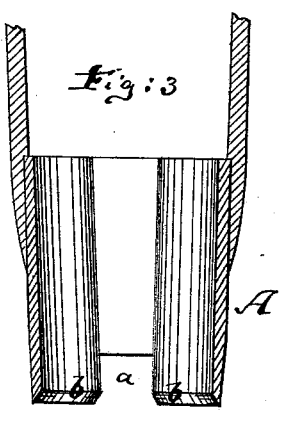
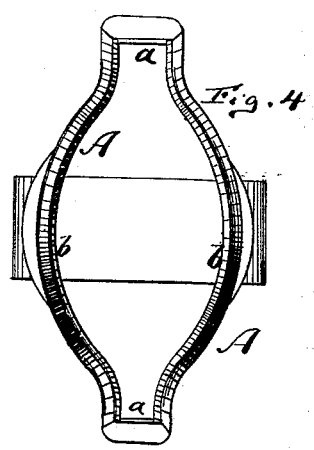
Witnesses
John C. Tunbridge
T. B. Mosher
Inventor:
Wm. Bishop Carr
by A. v. Briesen
his attorney
N. PETERS, PHOTO-LITHOGRAPHER, WASHINGTON, D. C.

UNITED STATES PATENT OFFICE.

WILLIAM B. CARR, OF BROOKLYN, NEW YORK.

IMPROVEMENT IN APPARATUS FOR AND METHODS OF SEAMING RUBBER GOODS.

Specification forming part of Letters Patent No. 222,345, dated December 9, 1879; application filed March 26, 1879.

*To all whom it may concern:*

Be it known that I, WILLIAM BISHOP CARR, of the city of Brooklyn, county of Kings, and State of New York, have invented a new and Improved Apparatus for and Method of Seaming Rubber Goods, of which the following is a specification.

This invention relates to the treatment of sheets of rubber or other gum which are to be cut into suitable shapes and united at the edges to form bags, balloons, articles of wearing apparel, or other goods.

My invention consists in means for simultaneously cutting and firmly uniting in one operation the edges of two pieces of india-rubber, caoutchouc, gutta-percha, or other equivalent gum.

To this end I use a cutting-tool of proper shape, but which is not endless, and bevel its edges to operate it in connection with a cushioned support for the two pieces of india-rubber or other gum.

In the accompanying drawings, Figure 1 represents a top view of a cushioned table containing two pieces of india-rubber or other gum to be united and shaped by the cutter, which is shown in horizontal section. Fig. 2 is a vertical cross-section, on an enlarged scale, of the table, cushion, knife, and rubber, on the line *c c*, Fig. 1. Fig. 3 is a vertical section of the knife shown in Fig. 4. Fig. 4 is a bottom view of a knife of different outline from that shown in Fig. 1.

Similar letters of reference indicate corresponding parts in all the figures.

The knife or cutter A has a blade, either continuous, as in Fig. 1, or in sections, as in Fig. 4, the outline of which corresponds to the contour of the pieces of rubber or other gum to be cut out.

It is an essential feature of my invention that the cutting-edge of the blade be not endless, as it is necessary to have one or more openings, *a*, therein, for the admission of air between the two sheets of rubber or other gum.

It is also an essential characteristic of my invention that the knife be made with a pronounced bevel, *b*, above its cutting-edge. The thicker the rubber or other gum to be cut the thicker must be the knife-blade, in order to obtain the requisite pressure.

B is the table, which should be quite firm and secure. C is a cushion, of pasteboard, felt, lead, or other suitable material, placed upon the table B, and held thereto, if desired, by suitable clamps or devices D.

The two sheets E F of india-rubber or other gum (or one sheet folded double) are laid flat upon the cushion C, one sheet or fold directly over the other.

The rubber or other gum must be only partly cured or not cured at all, so that it will yet be adhesive under pressure.

The knife A, when placed over the india-rubber or other gum, as in Fig. 1, receives a smart blow with a mallet or other tool or means, and is thereby forced through the rubber or other gum, cutting it at one operation in the desired manner, and at the same time pressing the cut edges tightly together by means of the bevel *b*. When the knife is taken off the cut edges will be found to be united more tenaciously than any other part of the rubber or other gum, so that if the knife is of nearly circular form, as in Fig. 1, a perfect bag is produced. If the knife is straight or slightly bent, the incision will vary accordingly; but the result will always be that the cut edges will be firmly and properly united by the pressure of the bevel *b*, so as to require no other fastening. The rubber or other gum, after having thus been shaped and united, may be further cured or otherwise treated for use in the arts.

It is essential to the success of my invention that the cushion C be used, as otherwise the bevel *b* would not be able to properly compress the cut edges of the rubber or other gum.

It is likewise necessary to permit air to enter between the sheets of rubber or other gum during the act of cutting, as otherwise the bulging which takes place by crowding the cut edges down into the cushion (see Fig. 2) could not take place.

It will be perceived that by my invention the united edges of the piece of rubber or other gum are united with equal pressure and in equal degree throughout at one operation.

I am aware that heretofore rubber tubes were formed by cutting a piece of folded rubber with a pair of scissors, thereby causing the cut ends to adhere to a limited extent, but to an unequal degree, as the leverage of the scissors' blades varies during the operation. This I do not claim; but I do claim—

1. The knife A, made with a pronounced bevel, b, and with two or more ends, for use, in combination with the cushion C and table B, in simultaneously cutting and uniting two pieces of india-rubber or equivalent gum, substantially as herein shown and described.

2. The process herein described of simultaneously cutting two pieces of india-rubber or equivalent gum and firmly uniting them at one operation and by one single motion of the cutting-instrument, substantially as herein shown and described.

3. As a new article of manufacture, a bag or article of india-rubber or equivalent gum, composed of two or more pieces, which are united at the edges, at one single operation, with equal pressure and in equal degree throughout, substantially as specified.

The foregoing description of my invention signed by me this 19th day of March, 1879.

WILLIAM BISHOP CARR.

Witnesses:
T. B. MOSHER,
W. G. E. SCHULTZ.